Dec. 9, 1958  E. W. ROGERS ET AL  2,863,498
DUAL FUEL BURNER

Filed Oct. 8, 1952  3 Sheets-Sheet 1

INVENTORS
Ernest W. Rogers
Robert C. Beal

ATTORNEYS

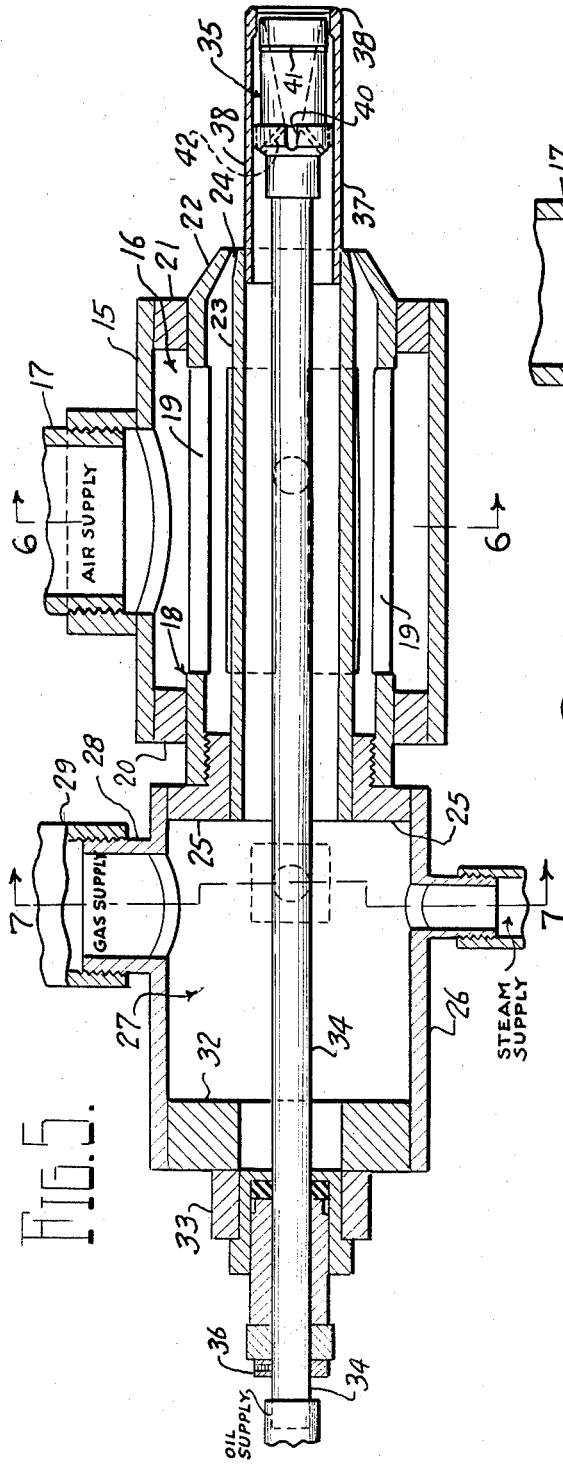
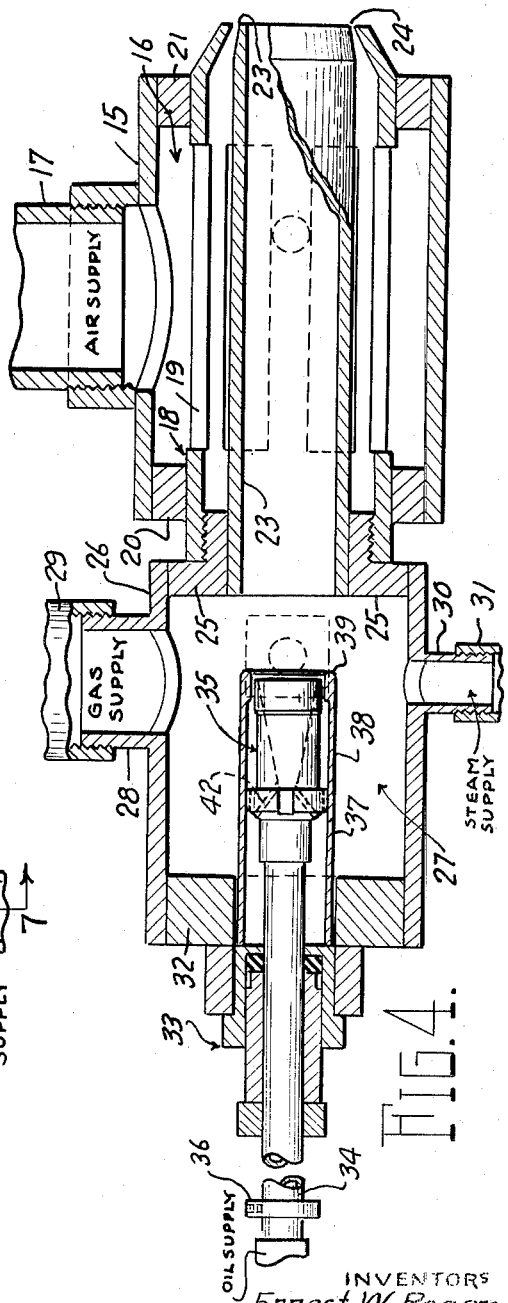

Dec. 9, 1958 E. W. ROGERS ET AL 2,863,498
DUAL FUEL BURNER
Filed Oct. 8, 1952 3 Sheets-Sheet 3

INVENTORS
Ernest W. Rogers
Robert C. Beal

ATTORNEYS

United States Patent Office 2,863,498
Patented Dec. 9, 1958

2,863,498

DUAL FUEL BURNER

Ernest W. Rogers and Robert C. Beal, Kansas City, Kans., assignors to Owens-Corning Fiberglas Corporation, a corporation of Delaware Application October 8, 1952, Serial No. 313,662

3 Claims. (Cl. 158—11)

This invention relates to a dual fuel burner particularly designed for use in large furnaces such as glass melting tanks and the like and, therefore, in heating service requiring constant high heat and the resulting consumption of large quantities of fuel.

In industries such as the glass industry where constant heat of large volumes of material must be maintained at high temperatures, the fuel consumption presents a problem of supply. In many localities sharp changes in weather cause the fuel supplying facilities to be overtaxed, resulting in a curtailment of use being enforced by governmental authorities and usually most adversely affecting industrial users. For example, when there is a temperature drop in a community serviced by natural gas, the utility may sharply curtail the volume of the gas made available to a large consumer such as a glass plant.

In order to prevent such a curtailment from causing a shutdown, most such industries have equipped their furnaces or tanks in such a manner as to permit the changeover to be made. This involves either a complete duplication, with two sets of fuel consuming mechanisms that are alternatively employed or the removal of one type of burner and the installation of a different type of burner designed for the substitute fuel. This removal and installation not only is expensive but of necessity it entails a considerable delay due to the work required to make the change.

It is, therefore, the principal object of this invention to provide a dual fuel burner designed to accommodate either fuel gas or fuel oil.

It is another object of this invention to provide a dual fuel burner designed for combusting either fuel gas or fuel oil in which the changeover from the one fuel to the other is accomplished in but a few minutes because no parts need be exchanged—the position only of certain parts needing to be changed.

It is yet another object of this invention to provide a dual fuel burner capable of combusting either fuel gas or fuel oil and easily changeable from the one to the other in which the heating effects of both are substantially the same regardless of which fuel is being burned.

These objects and more specific objects will be better understood by reference to the specification which follows and to the drawings, in which:

Fig. 4 is a greatly enlarged vertical sectional view taken on the line 4—4 of Fig. 1.

Fig. 5 is a similarly enlarged vertical sectional view taken on the line 5—5 of Fig. 2.

Figure 1:
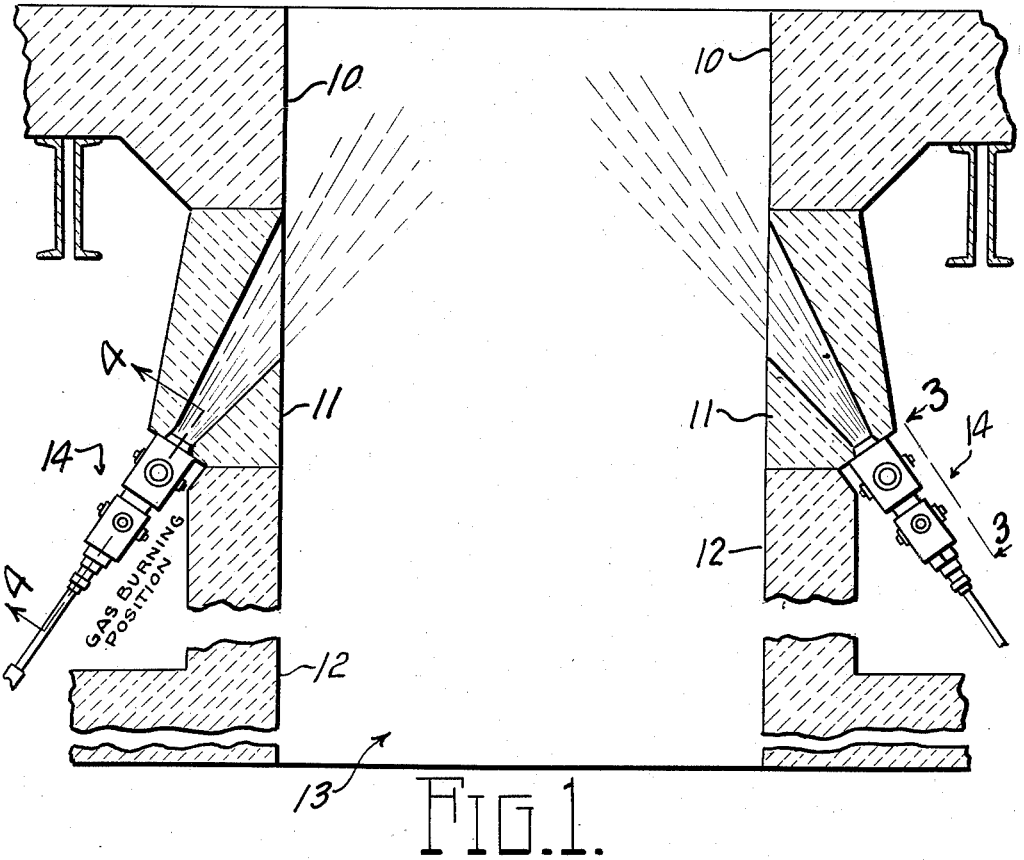
Fig. 1 is a plan view on a small scale showing a firing pot of a large industrial furnace, for example a glass melting tank, and showing two burners embodying the invention in place in the walls, the burners being shown in the fuel gas combusting position.

An industrial furnace, for example a glass melting tank, is constructed from large masses of heat insulation material, for example, the blocks 10, 11 and 12 as shown in Fig. 1. At appropriate locations around the tank the insulating blocks may be so constructed as to provide for firing ports, for example, the ports 13 in Fig. 1 and each port may be provided with one or more fuel burners generally indicated by the reference number 14 in Fig. 1.

Figure 2:
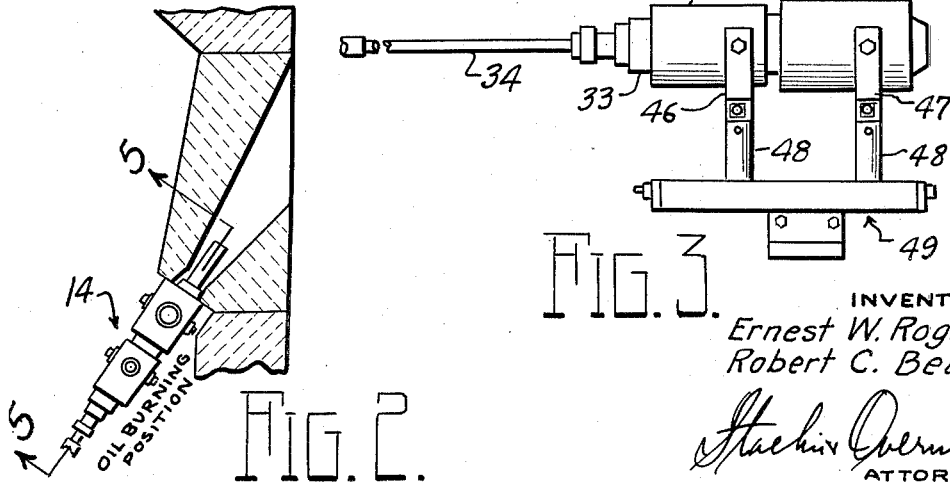
Fig. 2 is a fragmentary view corresponding to a portion of Fig. 1 but showing a burner embodying the invention in fuel oil burning position.

The fuel burners 14 of Fig. 1 which embody the instant invention are shown in that figure in their fuel gas burning position. By comparing the illustration of the burners 14 in Fig. 1 with the illustration of the burners 14 as shown in Fig. 2 and by similarly comparing the enlarged vertical cross sectional views, Figs. 4 and 5 respectively, the simplicity of the change from the position to burn fuel oil to the position to burn fuel gas and vice versa can be seen and will be explained in detail below.

A burner embodying the invention comprises a cylindrical air supply housing 15 defining an air chamber 16, the housing 15 having an air supply pipe 17 threaded thereinto. The air supply housing 15 surrounds a generally coaxial air manifold which is generally tubular in shape and through the walls of which are cut a plurality of slots 19 to provide for the passage of air from the chamber 16 into the interior of the manifold 18. At the rear (the left in Figs. 4 and 5) an end wall 20 of the housing 15 forms the end of the chamber 16 and is tightly welded both to the outer wall of the housing 15 and the wall of the manifold 18. A similar end wall 21 is similarly welded at the front or right end of the housing 15.

The manifold 18 extends forwardly of the housing 15 having a cone shaped end 22 which narrows down around the end of a fuel conduit 23 which extends concentrically through the manifold 18. The edge of the cone shaped end 22 is radially spaced from the edge of the fuel conduit 23 forming an annular air orifice 24 and providing that an annular blast of air is jetted around the fuel conduit when the burner is operating.

The rear end of the fuel conduit 23, the walls of which are imperforate, is welded or otherwise firmly and tightly sealed to an externally threaded collar 25 that is in turn welded to a generally cylindrical housing 26 which forms a gas supply chamber 27. The rear end of the air manifold 18 is threaded onto the exterior of the collar 25 to assemble the burner. The housing 26 has a nipple 28 onto which a gas supply pipe 29 may be threaded and a secondary nipple 30 which receives a steam supply line 31.

The rear wall of the gas supply housing 26 is formed by a disk 32 which supports a packing gland generally indicated at 33 and through which slides an oil supply pipe 34. The oil supply pipe 34 has an oil jet 35 on its front end and a stop collar 36 on its rear end. The oil jet 35 has an annular shoulder 37 which is a press fit in the interior of a sleeve 38. The sleeve 38 extends longitudinally around the jet 35 and slidingly fits the interior of the tubular fuel conduit 23.

When the burner is in gas burning position, as illustrated in Fig. 4, the jet 35 and sleeve 38 are withdrawn into the gas supply chamber 27 where they do not interfere with the flow of gas from the chamber 27 through the fuel conduit 23 to the front of the burner where the gas blends with air jetting from the annular orifice 24.

When the oil supply tube is slid backwardly to the position illustrated in Fig. 4, the rear edge of the sleeve 38 strikes the packing nut of the gland 33 to limit its rearward travel.

The forward end of the sleeve 38 has a beveled corner 39 which facilitates its entering the rear end of the fuel conduit 23 when it is being moved from the position shown in Fig. 4 to the position shown in Fig. 5. The sleeve 38 guides the jet 35 along the conduit 23 as it is being pushed forwardly. The stop collar 36 limits the movement of the oil supply line 34 to the right, stopping it in the oil firing position illustrated in Fig. 5.

The annular shoulder 37 has a plurality of axial slots 40 cut in its periphery and the interior of the jet 35 (see particularly Fig. 8) has a flaring opening 41. A plurality of passageways 42 are drilled through the shoulder 37 of the jet 35 leading from the interior of the sleeve 38 behind the shoulder 37 to the flared opening 41.

Figure 8:
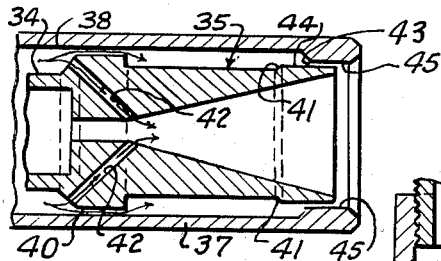
Fig. 8 is a vertical sectional view on an enlarged scale of an oil feeding nozzle and showing the passageways for steam by which the oil is vaporized.

As can best be seen in Figs. 4 and 8, steam admitted into the chamber 27 from the supply line 31 flows along the conduit 23 exteriorly of the oil supply pipe 34 and is led through the passageways 42 into the jet 35 where it atomizes the oil flowing into the flared opening 41 from the oil supply pipe 34. Additional steam flows through the slots 40 into the annular space surrounding the forward end of the jet 35 and is fed through an annular orifice 43 formed between a lip 44 on the forward end of the jet 35 and a lip 45 on the end of the sleeve 38.

Figure 3:
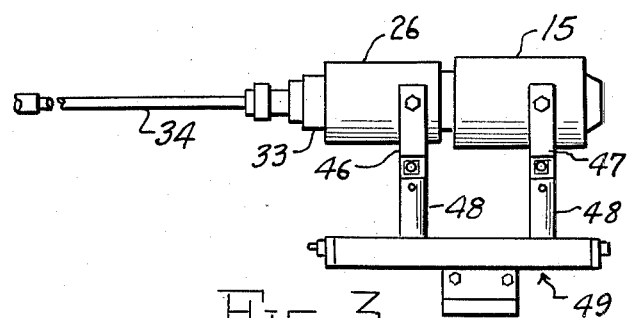
Fig. 3 is an enlarged view in elevation taken substantially from the position shown by the line 3—3 in Fig. 1.
Figure 6:
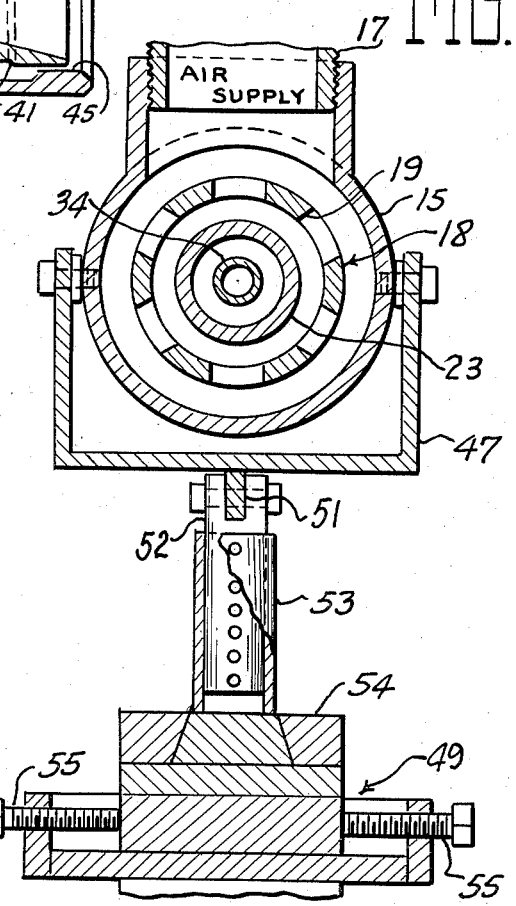
Fig. 6 is a vertical cross sectional view taken substantially on the line 6—6 of Fig. 5 and also illustrating burner mounting means.
Figure 7:
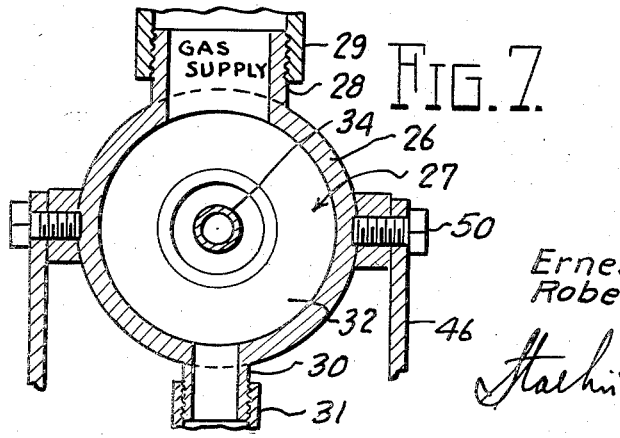
Fig. 7 is a vertical sectional view taken substantially on the line 7—7 of Fig. 5.

A burner embodying the invention may be supported (see Figs. 3, 6 and 7) by a pair of yokes 46 and 47 in turn mounted upon vertically adjustable stands 48 which are supported on an adjustable base 49. The yokes 46 and 47 are connected respectively to the air supply housing 15 and housing 26 by studs 50. Each of the yokes 46 and 47 has an ear 51 (Fig. 6) linked to a vertically adjustable post 52 that telescopes into a pipe 53 that is in turn supported on a bed plate 54 laterally adjustable by means of set screws 55 in the base 49.

We claim:

1. A burner for alternatively combusting a gaseous fuel and a liquid fuel, comprising, in combination, a chamber, a tubular fuel conduit extending straight forwardly from said chamber, said conduit having an open forward end, a tubular air manifold having an open forward end surrounding the forward end of said fuel conduit and forming an annular orifice therewith, a gaseous fuel line connected to said chamber, and a liquid fuel pipe extending through the wall of said chamber in axial alignment with said fuel conduit, said pipe having a burner jet on its forward end and being mounted in the wall of said chamber for axial sliding movement between a rear position with said burner jet wholly within said chamber and not obstructing said fuel conduit and a forward position with said pipe extending through said conduit and said burner jet in said annular orifice.

2. A burner for alternatively combusting a gaseous fuel and a liquid fuel, comprising, in combination, a chamber, a tubular fuel conduit extending straight forwardly from said chamber, said conduit having an open forward end, a tubular air manifold having an open forward end surrounding the forward end of said fuel conduit and forming an annular orifice therewith, a gaseous fuel line connected to said chamber, a liquid fuel pipe extending through the wall of said chamber in axial alignment with said fuel conduit, said pipe having a burner jet on its forward end and being mounted in the wall of said chamber for axial sliding movement between a rear position with said burner jet wholly within said chamber and not obstructing said fuel conduit and a forward position with said pipe extending through said conduit and said burner jet in said annular orifice and stop means on said liquid fuel pipe for limiting forward movement thereof to position said burner jet in said orifice.

3. A burner for alternatively combusting a gaseous fuel and a liquid fuel, comprising, in combination, a chamber, a tubular fuel conduit extending straight forwardly from said chamber, said conduit having an open forward end, a tubular air manifold having an open forward end surrounding the forward end of said fuel conduit and forming an annular orifice therewith, a gaseous fuel line connected to said chamber, a liquid fuel pipe extending through the wall of said chamber in axial alignment with said fuel conduit, said pipe having a burner jet on its forward end and being mounted in the wall of said chamber for axial sliding movement between a rear position with said burner jet wholly within said chamber and not obstructing said fuel conduit and a forward position with said pipe extending through said conduit and said burner jet in said annular orifice, and means for introducing a liquid fuel vaporizing medium into said chamber.

References Cited in the file of this patent

UNITED STATES PATENTS

| | | |
|---|---|---|
| 1,223,011 | Wendell | Apr. 17, 1917 |
| 1,416,574 | Oney | May 16, 1922 |
| 1,423,650 | Decuir | July 25, 1922 |
| 1,428,896 | McDonald et al. | Sept. 12, 1922 |
| 1,678,086 | Schrader | July 24, 1928 |
| 1,840,744 | Scott | Jan. 12, 1932 |
| 2,393,887 | Clements | Jan. 29, 1946 |